Nov. 21, 1967     H. E. CHANA     3,353,637

SERVO MOTOR

Filed Oct. 22, 1965

INVENTOR.
Howard E. Chana

BY

*a.m. Heiter*

ATTORNEY

United States Patent Office 3,353,637
Patented Nov. 21, 1967

3,353,637
SERVO MOTOR
Howard E. Chana, Flint, Mich., assignor to General Motors Corporation, Detroit, Mich., a corporation of Delaware
Filed Oct. 22, 1965, Ser. No. 501,821
11 Claims. (Cl. 188—152)

ABSTRACT OF THE DISCLOSURE

A servo assembly for calibrating the frictional engagement and disengagement of clutch or brake friction members to effect a smooth, calibrated shift in a change speed transmission. For engagement of the friction members, a primary piston, movably mounted in a secondary piston, responds to hydraulic apply pressure by exerting an apply force through a cushion spring and an apply rod to take up clearance between the friction members. The cushion spring operates subsequent to the initial engagement of the friction members and in response to further apply movement of the primary piston by deflecting to reduce the rate of apply force and the frictional engagement of the friction members. The primary piston movement when initially effecting friction member apply also decreases the force of the secondary piston return spring which subsequently moves to increase apply volume and, accordingly, further reduces the rate of frictional member engagement. The secondary piston and the primary piston then sequentially ground on the apply rod to increase the rate of apply force and insure positive engagement of the friction members. Calibrated friction member disengagement is accomplished by admitting hydraulic release pressure to the release side of the pistons. The action of the pistons for friction member release is converse to the apply sequence.

---

Figure 1:
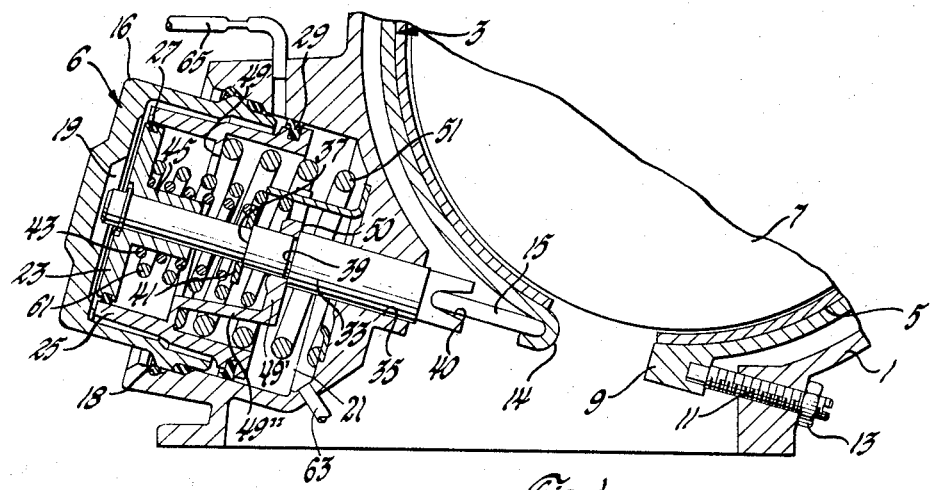

This invention relates in general to servo motors and more particularly to an advanced pressure-responsive, dual-piston servo assembly operable to effect improved calibrated shifts in a multi-speed transmission.

Prior art servo assemblies for friction-drive-establishing devices have generally been satisfactory and effective to change ratio in vehicle multi-speed transmissions. However, these prior servo assemblies frequently do not provide sufficiently calibrated shifts to meet higher standards for softer shifts, improved overlap shifts and improved shift control. The present invention, which meets these higher standards, incorporates a primary apply piston, telescopically mounted within a secondary piston, which is initially movable in response to apply pressure to take up clearance between the friction members of a friction-drive-establishing device. On further primary piston movement appropriate cushioning means, between this piston and an apply rod, deflects to reduce the rate of apply force applied by the piston to the friction members and to slowly increase the torque capacity thereof. A secondary piston which forms an important part of this invention subsequently functions as an accumulator piston to increase apply volume and further decrease the rate of apply force exerted by the primary piston on the friction members to provide for softer shifting from dynamic to static operating conditions. In a later stage of apply operation the secondary piston converts fluid pressure into mechanical load which is added to the apply force of the primary piston to provide for a large safety factor and insure highest friction member torque capacity.

The present invention improves coast downshifting by providing soft overlap shift to eliminate the neutral interval between high clutch release and low band apply and the resulting engine flair. Furthermore, due to the softer overlap shifting objectional shift shock or "clunk" is reduced or eliminated. In shifting from neutral to drive a reduced rate of band apply is obtained to produce a highly desirable soft shift. Forced kickdowns are also improved since the large volume of oil exhausted through the high clutch and the soft engagement of the low band produces greater control of high clutch to low band engagement. Furthermore, since there is reduced volume required for initial band movement to take up clearance, band adjustment does not substantially vary calibration as in the prior art. Also, due to the larger displacement of oil by the piston assembly, upshifts are substantially improved.

An object of this invention is to provide a new and improved servo motor.

Another object of this invention is to provide a dual-piston servo assembly to provide for calibrated softer shifts in a multi-speed transmission in which a primary piston moves at low apply volume to take up clearance between friction members and subsequently moves to apply a cushioned force to these members conditioning them for low torque capacity and in which a secondary piston moves to increase apply volume to reduce the rate of apply force to gradually increase their torque capacity.

Another object of this invention is to provide a dual-piston servo for effecting improved calibrated ratio change in a multi-ratio transmission in which a primary piston applies a cushioned load to the selectively engageable friction members of a friction unit to provide for dynamic operation of the friction members; subsequently, in which the secondary piston acts as an accumulator to taper the rate of apply to gradually increase their torque capacity; and later, in which both the primary and secondary pistons cooperate to apply a large force to these friction elements for maximum torque capacity.

Figure 2:
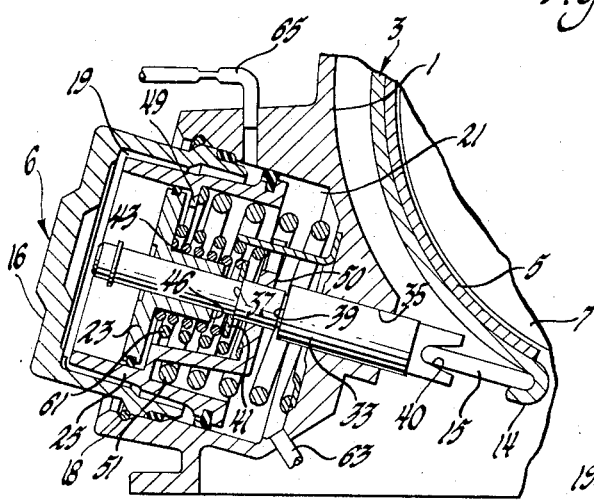
Figure 3:
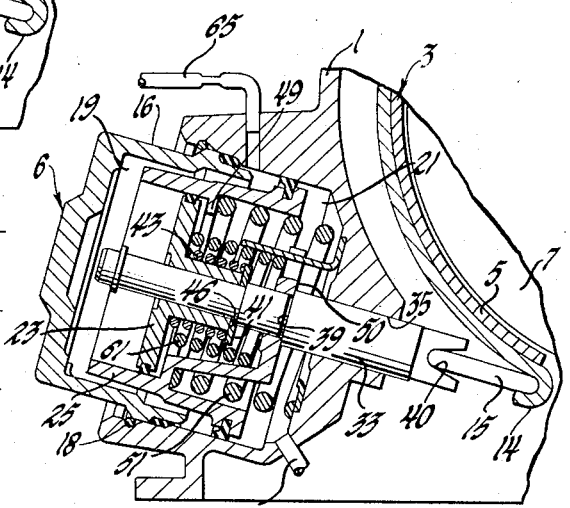
Figure 4:
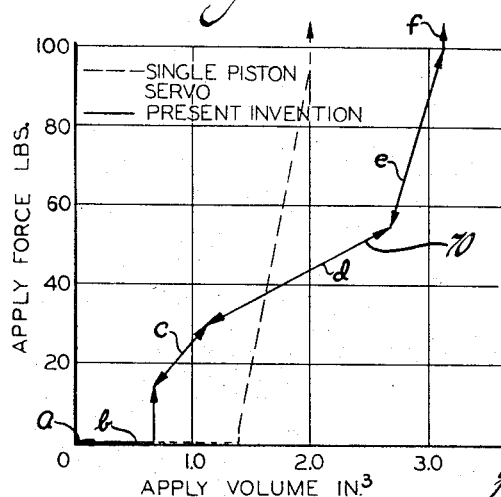

These and other objects of this invention will become readily apparent from the following detailed description of the invention and the drawings, in which:

FIGURE 1 is a cross-sectional view of the preferred embodiment of the invention, FIGURES 2 and 3 are similar to the view of FIGURE 1 and illustrate part of the operation of the invention, and FIGURE 4 is a graph illustrating different phases of operation of the invention.

Referring more particularly to FIGS. 1 and 2 of the drawings, there is ilustrated a portion of a transmission case 1 which may extend back from a vehicle engine to house the power transmission which includes the friction-drive-establishing device 3. The friction-drive-establishing device illustrated is provided by a brake band 5 and a brake band actuating servo assembly 6. As shown, the brake band 5 encompasses an annular brake drum 7 which is connected to a control gear of a gear unit such as the sun gear of a simple planetary unit not shown. The brake band has at one end an anchor portion 9 secured to the case 1 by a band-adjusting screw 11 and a retainer nut 13. The other end of the band is reversely curved to form an adapter 14 which receives an end of force-transmitting link 15 operatively connected to the piston assembly is housed within a cylindrical chamber formed in the case closed by servo cover 16 and secured by snap ring 18. The piston assembly divides this chamber into an apply chamber 19 and a release chamber 21 and includes an annular primary piston 23 mounted for sliding movement within a generally cylindrical, sleeve-like secondary piston 25 which is, in turn, slidably mounted to the chamber. The pistons 23 and 25 have annular seals 27 and 29 to effectively separate and seal the apply chamber and release chamber as illustrated.

The primary piston is mounted for limited sliding movement on the upper portion of a piston rod 33 which extends completely through the assembly chamber and through a bore 35 formed in the case 1. The piston rod is formed with stepped shoulders 37 and 39 intermediate of its ends and is bifurcated at one end at 40 to form a seat for the end of the link 15. A washer or spring seat 41 is positioned on shoulder 37. This washer supports one end of a preloaded coiled cushion spring 43 while the other end contacts the release area of the primary piston. As shown, this spring surrounds a downwardly-extending collar portion or extension 45. This extension is integrally formed on piston 23 and has a lower contact surface 46 that under certain conditions engages the washer 41 to prevent further relative movement between the piston and the piston rod.

As shown in the drawing, the secondary piston has an inwardly-extending intermediate flange 49, one side of which forms a bearing surface for a secondary piston return spring 51 which is seated in the bottom of the piston assembly chamber. The secondary piston also has an offset center portion 49' joined to flange 49 by suitable arms 49''. This central portion 49' has an opening therein through which the piston rod extends and also has a flat bearing side 50 which is adapted under certain conditions to contact the shoulder 39 to allow the secondary piston to apply a force to the piston rod 33. The opposite side of flange 49' provides a seat for the primary piston return spring 61 that surrounds the cushion spring and contacts the release side of the primary piston 23. Spring 61 has a spring rate which is less than the spring rate of secondary piston return spring 51.

A fluid-conducting release line 63 connects the release chamber of the servo to a fluid pressure controlling shift valve through a high clutch apply chamber, which is not shown. A second fluid-conducting apply line 65 is connected to main line pressure through a shift valve and to a high speed downshift timing valve, also not shown.

FIGURE 1 discloses the double piston servo in an inactive or fully-released position in which the brake band is not applied to the brake drum. This position is indicated as point *a* on a plot 70 of apply force vs. apply volume of this embodiment of the present invention. For apply of the brake band, operating pressure is admitted by appropriate operation of control means such as the shift valve to the apply chamber 19. Primary piston 23 converts this pressure into a mechanical load opposed by the force of the primary piston return spring 61. Piston 23, cushion spring 43 and piston rod 33 will begin to move together relative to the secondary piston when the pressure builds in chamber 19 to an amount sufficient to overcome the force of the primary piston return spring 61. This movement takes up the brake band play resulting from initial band adjustment; apply volume is quite low at this time. This phase of operation is illustrated by a segment *b* in the plot 70 of FIG. 4. The primary piston will then move relative to rod 33 compressing cushion spring 43 to gradually increase the force on the brake band, as illustrated by FIG. 2 and segment *c* of the plot of FIG. 4. It will be appreciated at this time that the total return spring force on the secondary piston will be decreased as much as it is opposed by the force of the primary piston return spring whose spring load has been increased. Since the spring force retarding the movement of the secondary piston has been reduced, the secondary piston will begin movement from the FIG. 1 position. This movement occurs when the pressure in the apply chamber which acts on the secondary piston is sufficient to overcome the reduced force of the secondary piston return spring. The movement of the secondary piston does not apply additional force to the primary piston but causes a further tapering of the rate of apply force by the primary piston since apply volume has been increased, as indicated in segment *d* of the plot. During this phase of operation relative movement or slippage between drum 7 and brake band 5 terminates. Depending on torque requirement this wash out or change from dynamic to static condition is at any point on plot segment *d*. Contact portion 50 of the secondary piston then bottoms on the annular shoulder 39 and this piston applies an additional force on the rod sharply increasing total apply force, as shown by segment *e* of plot 70. The primary piston at this time serves as an accumulator piston. Finally, as shown in FIG. 3 the primary piston fully deflects the cushion spring 43 to allow contact surface 46 to engage washer 41. Apply force will thus increase even more rapidly as shown by segment *f* of the plot. Segments *e* and *f* of the plot provide a safety factor which insures static operation of the friction-drive-establishing device. The apply operation of the preferred embodiment of the double piston servo of this invention is compared with the plotted apply operation of a single piston servo in FIG. 4.

Due to the large volume of fluid required from the high clutch apply chamber to allow the piston assembly to move the low band 5 from its fully-engaged position of FIG. 3 to the inactive position of FIG. 1, calibration of band release is materially improved and upshifts from low band to high clutch are softer.

As fluid pressure in the clutch apply chamber increases, the release volume, furnished from the high clutch apply chamber through line 63 to the low servo release chamber 21, increases. The pressure of this release fluid plus the force of return spring 61 moves the primary piston off of seat 39. The brake band at this time still firmly holds drum 7. Clutch apply pressure continues to increase and the secondary piston moves with the aid of return spring 51, off of its seat to rapidly increase release volume. The rate of high clutch apply pressure will be tapered accordingly. Depending upon operating conditions, a soft low band to high clutch shift could be completed. However, if the shift is not completed further movement of both primary and secondary pistons further increase release volume and the drive clutch apply pressure gradually rises to ensure this soft shifting. The primary and secondary pistons are then forced to their inactive FIG. 1 position and there is no further increase in release volume and full pressure is applied to the high clutch as a safety factor.

Transmissions incorporating prior single piston low servo and high clutches to condition the transmission for ratio changes have frequently had a relatively large neutral interval in which there was no clutch or brake engagement for a period during coast downshifts. This resulted in objectionable engine flair. When the neutral interval was eliminated there was objectionable shift shock. By slowing the rate of band apply as applicant has done at line pressure near minimum line pressure calibration can be further from the neutral interval side favoring overlap shifting in which the objectionable shift shock is eliminated or substantially reduced. Garage shifts are materially improved since the reduced rate of band apply during shifts from neutral to drive provides a much smoother shift engagement. For forced kickdowns the larger displacement of oil exhausted through the high clutch and the softer engagement of the low band produces improved calibration or better control of the high-clutch to low-band shift. Furthermore, calibration variations resulting from band adjustment is reduced in this invention since smaller apply volumes are involved when band clearance is taken up. Also, upshifts are substantially improved since upshift accumulator provided by the low servo release chamber is substantially greater than that of the prior art.

It will be understood that many changes and modifications may be made to the particular structure which applicant has specifically pointed out as only one example of his invention. It will be, therefore, understood that this invention is not to be restricted to such an example but only by the claims which follow.

I claim:
1. In a servo motor, a piston assembly for converting fluid pressure into a mechanical load for engaging selectively engageable friction members, contact means for transmitting apply force from said piston assembly to the said selectively engageable friction members said assembly including first and second pistons, means for operatively connecting said first piston to said contact means, said second piston being movable relatively to said first piston to substantially increase piston assembly apply volume to calibrate the force applied by said first piston to said selectively engageable friction members through said contact means, housing for said assembly, said assembly separating said housing into piston apply and release chambers, said piston assembly including a primary piston and a secondary piston, one of said pistons being movably mounted within the other of said pistons, a return spring seated in said housing and contacting the release side of said secondary piston, a second return spring mounted on said secondary piston and contacting the release side of said primary piston, said contact means including an apply rod extending from said housing into operative engagement with said friction members, said pistons being movably mounted on said apply rod, and means for limiting movement of said pistons on said rod to enable both of said pistons to apply a force to said friction members.

2. In a servo motor, a piston assembly for converting fluid pressure into a mechanical load for engaging selectively engageable friction members, contact means for transmitting apply force from said piston assembly to the said selectively engageable friction members said assembly including first and second pistons, means for operatively connecting said first piston to said contact means, said second piston being movable relatively to said first piston to substantially increase piston assembly apply volume to calibrate the force applied by said first piston to said selectively engageable friction members through said contact means, cushioning means between said primary piston and said contact means said primary piston being movable mounted within said secondary piston to exert initial apply force to said friction members, a housing for said piston assembly, said pistons of said assembly dividing said housing into apply and release chambers, fluid-conducting means for conducting fluid under pressure to said apply chamber to move said pistons to an apply position, fluid-conducting means for exhausting said release chamber, said secondary piston being movable under predetermined conditions relative to said primary piston to increase apply volume thereby decreasing the rate of apply force transmitted by said primary piston to said structure.

3. The structure defined in claim 2 wherein said motor-actuated structure is formed by a plurality of engageable friction elements, said primary piston being initially movable to take up clearance between said elements at low apply volumes, said cushion spring deflecting on further primary piston movement to decrease rate of apply force transmitted to said elements by said primary piston.

4. The device defined in claim 3 wherein said secondary piston has a central portion through which said connecting means extends, said connecting means having a shoulder portion which is adapted to contact said central portion to enable said secondary piston to exert a mechanical force on said friction elements.

5. The device defined in claim 4, said connecting means being a piston rod, and each of said pistons being mounted for limited movement on said rod.

6. In a servo motor for moving relatively rotatable friction members into and out of full frictional engagement, a housing having a cavity therein, a piston assembly movably mounted in said cavity to define at least one fluid working chamber, means for supplying fluid under pressure to said working chamber, said piston assembly including primary and secondary pistons, and apply member operatively connected to one of the friction members, first resilient means in said cavity for urging said piston member to a predetermined position in said working chamber, second resilient means mechanically connecting said primary piston and said apply member for transmission of primary piston apply force to said apply member to initially move said apply member and take up clearance between the friction members and for subsequent deflection to increase the volume of said working chamber and reduce the rate that force is applied to the friction members by said primary piston, means for transmitting primary piston apply force to said secondary piston opposing the force of said first resilient means to permit said secondary piston to move in said cavity to further increase the volume of said fluid working chamber so that the rate that force is applied by the primary piston will be further reduced to calibrate the engagement of said friction members.

7. In a servo motor for moving relatively rotatable friction members into and out of frictional engagement, a housing having a cavity therein, a piston assembly movably mounted in said cavity to define first and second fluid working chambers, means for each of said working chambers for conducting operating fluid to each of said working chambers and exhausting fluid therefrom, said piston assembly including primary and secondary pistons, an apply member in said housing extending from said chamber into mechanical engagement with one of the friction members, resilient means operatively mounted in said cavity for urging said secondary piston to a predetermined location in said working chamber, second resilient means mechanically connecting said primary piston and said apply member for transmitting primary piston apply force to said apply member to move the friction members into contact with each other and to subsequently deflect after initial friction member contact to reduce the rate that force is applied to said friction members, means for transmitting primary piston apply force to said secondary piston to permit said secondary piston to move in said cavity to increase the volume of said fluid working chamber and thereby graduate the pressure of working fluid therein to further reduce the rate of the apply force transmitted by the primary piston to said apply member and the friction members.

8. In a servo motor for moving relatively rotatable friction members into and out of static frictional engagement, a housing having a cavity therein, a piston assembly movably mounted in said cavity to define at least one fluid working chamber, means for supplying fluid under pressure to said working chamber, an apply member movably mounted in said housing and extending from said chamber into contact with one of the friction members, said piston assembly including primary and secondary pistons, means movably mounting each of said pistons in said chamber for movement relative to said apply member, means connecting said primary piston and said apply member to permit said primary piston to move relative to said apply member while applying a force thereto to extend the time at which the frictional members are fully engaged, means for transmitting primary piston apply force to said secondary piston to permit said second piston to move in said apply chamber to increase the apply chamber volume so that pressure therein will gradually increase to further extend the time required by the assembly to move the friction members into full frictional engagement for static operation.

9. In a servo motor for moving relatively rotatable friction members into and out of static frictional engagement, a housing having a cavity therein, a piston assembly movably mounted in said cavity to establish at least one fluid working chamber on one side thereof, means for supplying fluid under pressure to said working chamber, mechanical means movably mounted in said housing and extending from said chamber into operative engagement with one of said friction members, said piston assembly including primary and secondary pistons, means movably mounting each of said pistons in said chamber for movement relative to said apply member, means connecting said primary piston and said apply member to permit said primary piston to move relative to said mechanical means while applying a force thereto to extend the time at which the frictional members are fully engaged, resilient means operatively connected to said secondary piston for urging said secondary piston to a predetermined position in said working chamber, means for transmitting primary piston apply force to said secondary piston to permit said second piston to move against the force of said last mentioned resilient means in said apply chamber to increase the apply chamber volume and to further extend the time required by the assembly to move the friction members into full frictional and static engagement.

10. The servo motor of claim 9 and further including contact means on said mechanical means to ground both of said pistons and thereby permit full apply force developed by both of said pistons to be transmitted to the friction members.

11. The servo motor of claim 10, said piston assembly further establishing a second fluid working chamber on the other side of said assembly, means for supplying fluid under pressure to said second chamber to effect a timed disengagement of the friction members.

References Cited

UNITED STATES PATENTS

| | | | |
|---|---|---|---|
| 2,513,192 | 6/1950 | McFarland | 188—77 X |
| 2,901,888 | 9/1959 | Swift | 188—77 X |
| 2,966,888 | 1/1961 | Jania et al. | 92—52 |
| 3,004,390 | 10/1961 | Duffy | 60—97 |

DUANE A. REGER, *Primary Examiner.*

UNITED STATES PATENT OFFICE
CERTIFICATE OF CORRECTION

Patent No. 3,353,637                         November 21, 1967

Howard E. Chana

It is hereby certified that error appears in the above numbered patent requiring correction and that the said Letters Patent should read as corrected below.

Column 2, line 57, for "assembly is" read -- assembly. The piston assembly is --.

Signed and sealed this 21st day of January 1969.

(SEAL)
Attest:

Edward M. Fletcher, Jr.                       EDWARD J. BRENNER
Attesting Officer                              Commissioner of Patents